Dec. 9, 1924.
I. J. HEARNE
SAWING APPARATUS
Filed Sept. 28, 1923
1,518,198
3 Sheets-Sheet 1
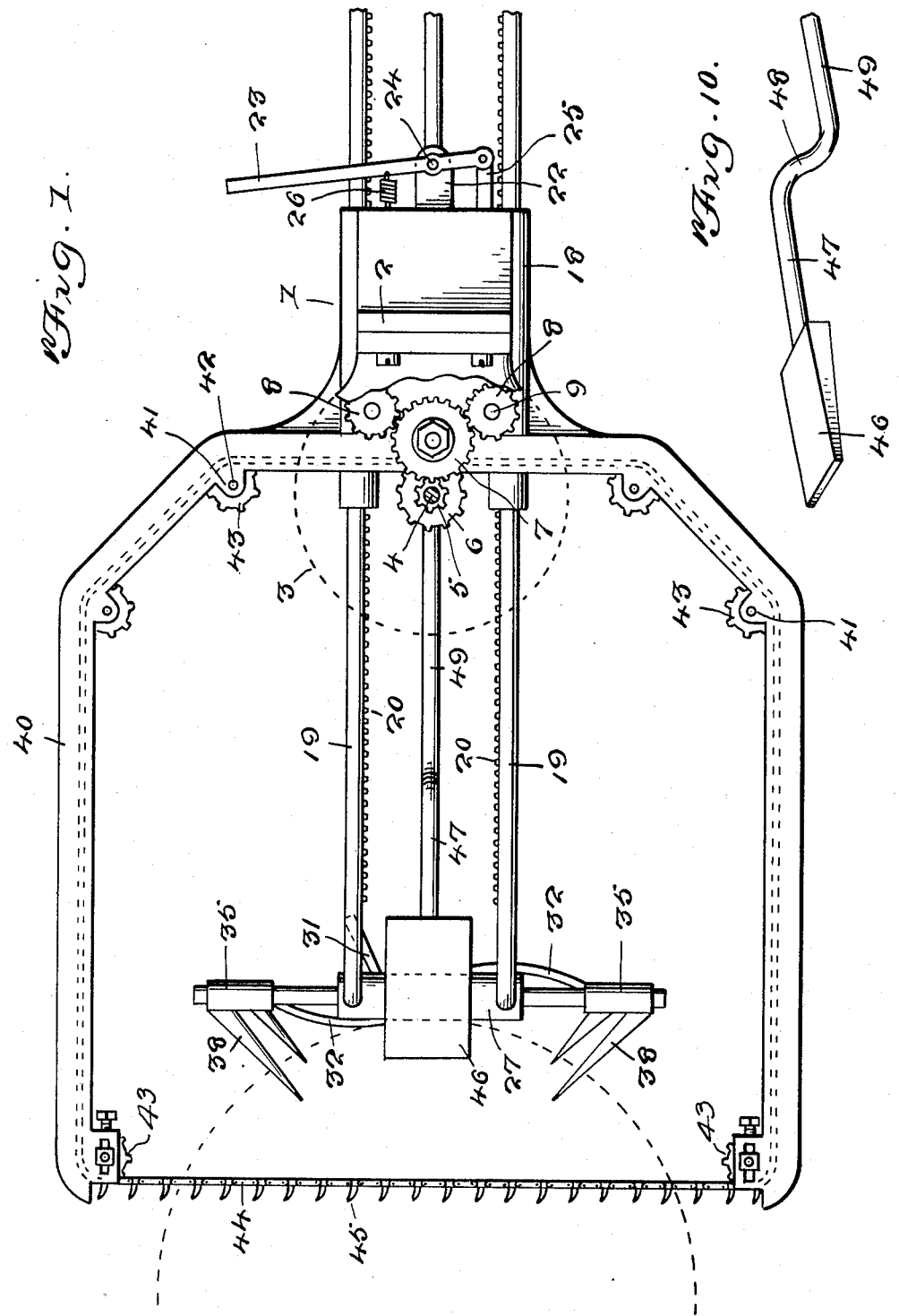
WITNESS:
E. R. Ruppert.
Isaac J. Hearne
INVENTOR
BY Victor J. Evans
ATTORNEY

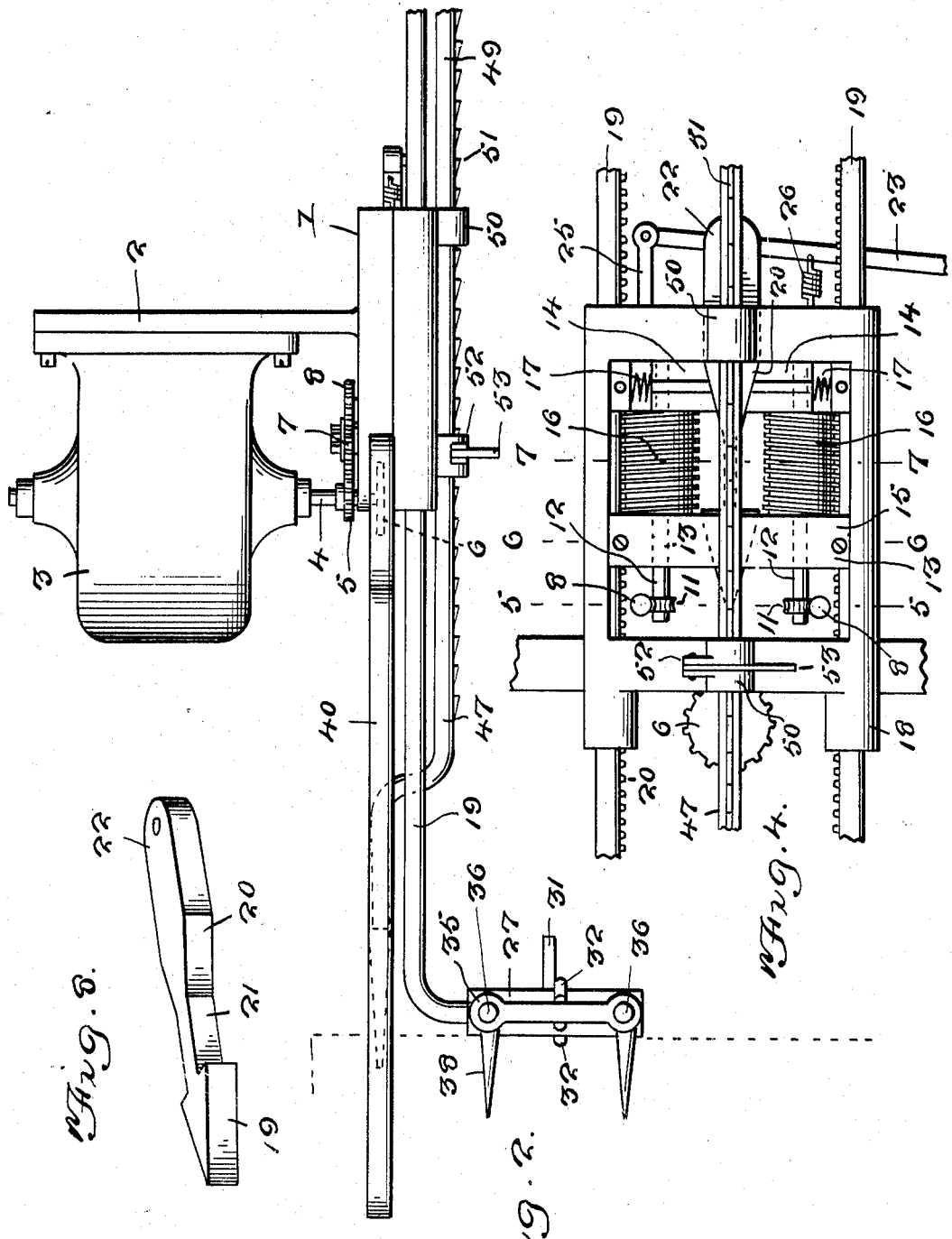

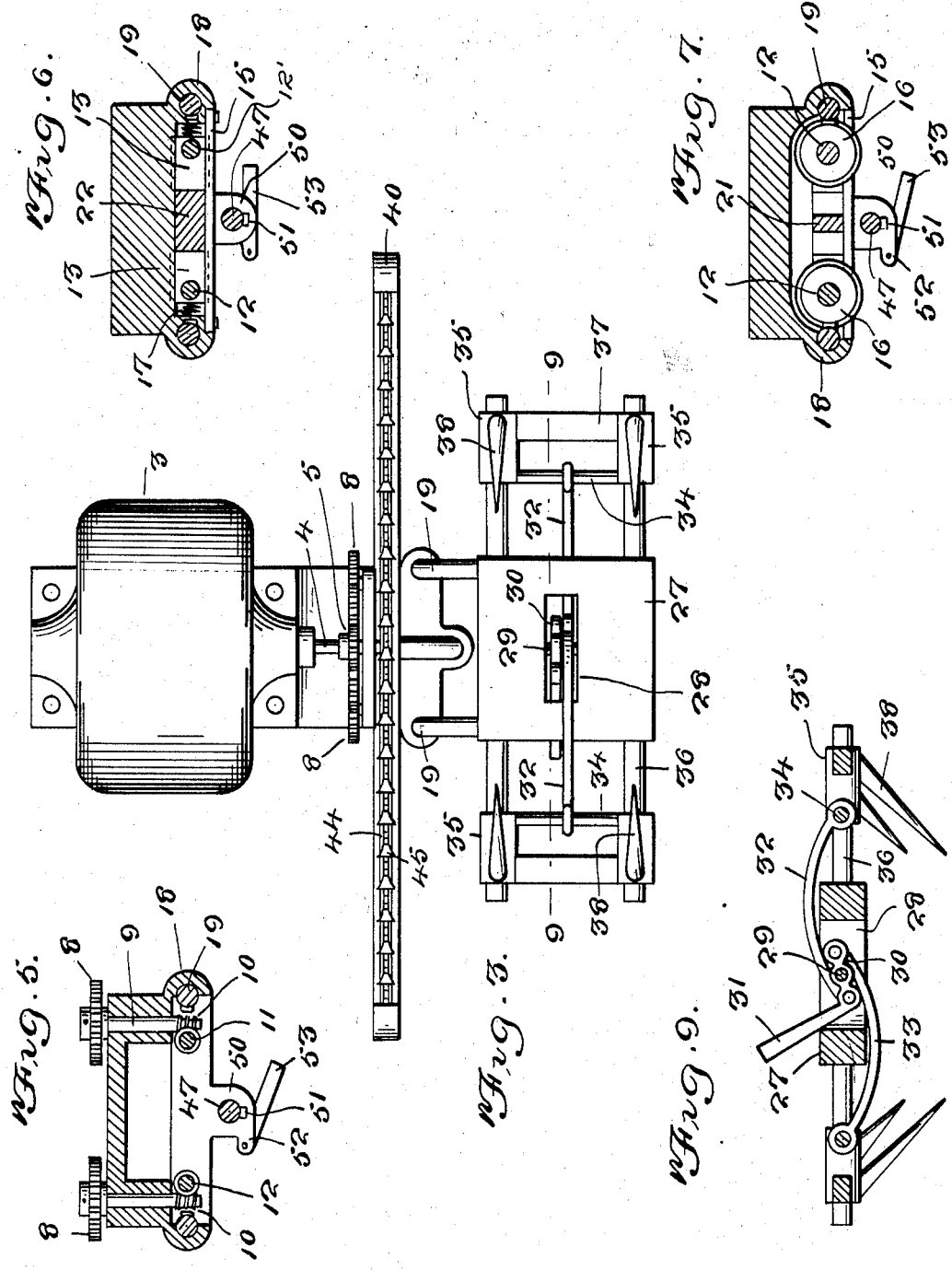

Patented Dec. 9, 1924.

1,518,198

UNITED STATES PATENT OFFICE.

ISAAC J. HEARNE, OF BERLIN, MARYLAND.

SAWING APPARATUS.

Application filed September 28, 1923. Serial No. 665,448.

*To all whom it may concern:*

Be it known that I, ISAAC J. HEARNE, a citizen of the United States, residing at Berlin, in the county of Worcester and State of Maryland, have invented new and useful Improvements in Sawing Apparatus, of which the following is a specification.

The object of this invention is the production of a tree sawing apparatus wherein an endless saw is employed for cutting the tree, wherein means is employed for holding the saw support on the tree, wherein means is provided for advancing the saw to its work and wherein a wedge element is arranged in the kerf made by the saw and movable at determined intervals to provide a free passage for the saw through the tree and likewise to cant the tree to cause the same to fall away from the apparatus when the same has been cut.

To the attainment of the foregoing and many other objects which will present themselves as the nature of the invention is better understood, the invention consists in the improvement as hereinafter described and claimed.

In the drawings:—

Figure 1 is a plan view of the improvement.

Figure 2 is a side elevation thereof.

Figure 3 is an end view thereof.

Figure 4 is a fragmentary plan view looking toward the under face of the same to illustrate the manner in which the worm wheels connect the teeth of the rack bars to advance the saw to its work.

Figure 5 is a sectional view on the line 5—5 of Figure 4.

Figure 6 is a sectional view on the line 6—6 of Figure 4.

Figure 7 is a sectional view on the line 7—7 of Figure 4.

Figure 8 is a view of the dog for holding the worm wheels in rack bar engagement.

Figure 9 is a sectional view approximately on the line 9—9 of Figure 3.

Figure 10 is a perspective view of the wedge member.

Referring now to the drawings in detail, the numeral 1 designates broadly the carriage of the improvement. The carriage is integrally formed adjacent to one of its ends with a flange 2 to which is bolted a motor 3. The motor may be electrically driven and has its drive shaft 4 depending through its casing and provided with a toothed wheel 5 and a sprocket wheel 6.

Journalled on the carriage and in mesh with the toothed wheel and pinion 5 there is a gear 7. The gear 7 is in mesh with a pair of similar gears 8—8 that have their shafts 9 journalled in suitable bearings on the carriage 1. The shafts 9 have their lower ends formed with worm teeth 10, to mesh with worms 11—11 on shafts 12—12. The respective shafts 12 are journaled through slidable blocks 13—13 and 14—14 respectively. The bearing blocks are supported on plates 15 secured to the open under face of the substantially rectangular carriage 1. Secured on each shaft 12 between the bearing blocks 13 and 14 therefor is a worm wheel 16. The bearing blocks 14 are influenced toward each other by springs 17 suitably supported on the carriage.

The sides of the carriage are provided with barrel portions 18, through the bores of which there are slidably received cross sectionally rounded rods 19 respectively. These rods have their inner faces toothed as at 20'. The rods are thus in the nature of rack bars and the teeth thereof are engageable by the worm wheels 16. Incident to the spring influenced bearing blocks for the shafts 12 of the worm wheels, the latter are normally sustained out of engagement with the said rack bars.

The inner or confronting ends of the bearing blocks 13 and 14 are cut at opposite angles and the said ends are engageable with the side edges of a diamond shaped head and the inclined side walls 20 provided on the reduced shank 21 on a slidable dog 22. The dog is of course, arranged for movement in suitable bearings on the carriage 1. The means for sliding the dog 22 to bring the worms 16 in engagement with the rack bars, comprises a lever 23 pivotally secured as at 24 to the rear end of the dog 22 and having one end pivotally supported on a bracket 25 that extends from the rear of the carriage 1. The lever is influenced in one direction by a spring 26 also attached to the carriage 1. The spring swings the lever in one direction causing the inclined faces of the dog 22 to be moved away from engagement with the inner faces of the bearing blocks and consequently normally retains the worm 16 from engagement with the teeth of the rack bars 19.

The rods 19 have their outer ends extended at a downward angle and have attached thereto a block 27. The block has a centrally substantially rectangular opening 28 therethrough in which there is centrally secured a vertically disposed shaft 29. On this shaft there is centrally mounted a rocker lever 30, one end of which being provided with an operating handle 31. To the ends of the rocker lever there are pivotally connected arched arms 32 respectively. The arms pass oppositely through the openings and are arranged upon the opposite sides of the block 27. The arms are loosely connected to bars 34 secured upon the inner ends of sleeves 35. The sleeve rods are arranged for longitudinal movement on outwardly directed rods 36 on the ends of a block 27. The sleeves 35 are also connected by outer members 37. The sleeves have secured thereon inwardly inclined prongs 38. When the device is brought to a tree to be cut the block 27 is arranged thereagainst. The handle 31 for the rocker lever 30 is swung to cause the arched arms 32 and 33 to slide the prong carrying sleeves 35 toward each other and to force the prongs 38 thereon into the tree. In this manner the device is effectively anchored to the tree. It is of course to be understood that the device may be supported upon a wheeled truck or skid so that the same may be readily moved in a forest in proper position to fell the trees.

Integrally formed with the carriage 1 on the face thereof nearest the prongs there is a substantially U-shaped yoke or frame 40. The yoke is channelled on the inner face thereof and is provided at desired spaced intervals with outstanding ears 41 arranged in opposed pairs. Between these ears there are journalled shafts 42 of sprocket wheels 43. Around the sprocket wheels 43 and engageable with the teeth of the sprocket wheel 6 there is an endless chain 44. The chain 44 is provided with outstanding saw teeth 45, and the teeth and chain provide a flexible endless saw.

The outer sprocket wheels 43 have their shafts journaled in adjustable bearings so that the saw can be properly tensioned.

When the prongs 38 are in impinging engagement with the tree, the carriage 1 and the endless saw carrying frame 40 are disposed to the rear of the block 27. Thereafter the lever 23 is operated to allow the motor to revolve the shafts 9 to cause the worms 10 to impart a rotary movement to the shafts 12 so that the worms 16 mesh with the teeth 20' of the rack bars 19 and will bodily move the carriage and the saw towards the tree. The lever 23 is thus held when the saw makes its cut into the tree.

In order to ease the saw in its work, and likewise to provide a means for canting the tree when cut in a direction away from the saw apparatus, I provide a wedge 46 designed to enter the kerf in the tree made by the saw. The wedge 46 is mounted on a shank in the nature of a rod 47. The wedge is arranged in a plane with the endless saw, and the shank 47 thereof has a downwardly bent portion 48 to permit of the main body portion 49 of the said shank being received thru bearings 50 formed with or centrally secured on the under face of the carriage 1. The body portion of the wedge shank is provided with teeth 51 that pass through a longitudinal channel in the bearings 50. Pivotally secured to an outstanding lug 52 on one of the bearings 50 there is a lever 53. The under face of the bearing is slotted whereby the lever may be swung thereinto to engage one of the teeth 51 of the shank, thereby locking the shank of the wedge to the body 1. Thus the wedge may be brought to move on the rack bars with the carriage and likewise caused to enter the kerf made by the saw to any determined extent.

It is thought that the foregoing description when taken in connection with the drawings will fully set forth the construction, operation and advantages of my invention to those skilled in the art to which such devices relate, but my features of invention are capable of extended application and I do not wish to be limited to the specific construction shown and described.

Having thus described my invention what I desire to claim as new is:—

1. In a means for felling standing trees, rack bars, means supported therefrom susceptible to impinging engagement with a tree to be felled, a carriage slidable on the rack bars, an endless flexible saw supported thereon and extending therefrom, motor operated means for imparting movement to the saw, means associated with said operating means for sliding the carriage on the bars and lever operated means for rendering the last mentioned means inoperative, wedge means supported by the carriage for entering the kerf in the tree made by the saw, and means for locking the wedge means to the carriage for movement therewith.

2. In a means for sawing standing timber, spaced bars, slidable prong carrying means supported from the ends thereof and susceptible for movement toward each other for impinging engagement with a tree to be sawed, a carriage slidable on the bars, a substantially U-shaped channel frame on the outer end of the carriage, sprocket wheels journalled thereon, an endless tooth carrying chain trained around the sprocket wheels, motor operated means for imparting motion to the chains, means associated therewith for imparting a longitudinal movement to the carriage, means for rendering said motion imparting means inoperative, a wedge for entering the kerf in the tree made by the saw, means supporting the wedge from the carriage and means for locking said wedge to said carriage to advance the same with the carriage.

3. In a means for sawing standing timber including a block, prongs supported at the sides thereof, means for moving the prongs toward each other to impinging engagement with the timber to be sawed, rack bars secured to the block and extended rearwardly therefrom, a carriage mounted thereon, a channelled yoke secured to the outer end of the carriage, sprocket wheels journalled thereon, means for adjusting the outer sprocket wheels in their bearings, an endless chain trained around the sprocket wheels, saw teeth carried thereby, a sprocket chain journalled in the bearings engageable with the chain, motor operated means for imparting motion thereto, worm wheels journalled in slidable bearings in the carriage, spring means influencing the bearings out of engagement with the rack bars, means influenced by the motor for imparting motion to the worms and lever operated means for influencing the bearings to spring the worms into rack bar engagement.

4. In a means for sawing standing timber, a block designed to be arranged against a timber to be cut, slidable prongs mounted on the ends thereof, lever operated means for moving the prongs to timber engagement, rack bars supporting the block and extended rearwardly therefrom, a carriage slidable in the rack bars, a substantially U-shaped frame on the forward end of the carriage, sprocket wheels journalled thereon, means for longitudinally adjusting the outer sprocket wheels with respect to the frame, a tooth carrying endless chain trained around the sprocket wheels, a motor supported on the carriage, a sprocket wheel driven thereby in mesh with the chain, worm wheels having shafts journalled in the slidable bearings in the frame, spring means influencing the bearings to spring the worms out of engagement with the rack bars, means operated by the motor for imparting motion to the worm shafts, a dog having wedge faces slidable between the bearings, a pivotally supported spring influenced lever connected with the dog for imparting longitudinal movement thereto to influence the bearings to spring the worms to engage the rack bars to cause the carriage and frame to move longitudinally on said rack bars, a wedge for entering the kerf made by the saw in the timber, a shank therefor having teeth thereon received through bearings in the carriage, and a pivoted lever on one of the bearings movable to engage the tooth of the shank to cause the wedge to move longitudinally with the carriage.

In testimony whereof I affix my signature.

ISAAC J. HEARNE.